(12) United States Patent
Temesvári et al.

(10) Patent No.: US 8,072,455 B2
(45) Date of Patent: *Dec. 6, 2011

(54) VIRTUAL TRACE-MULTIPLE VIEW MODELING SYSTEM AND METHOD

(75) Inventors: Péter Temesvári, Budapest (HU);
Zoltán Németh, Fonyód (HU)

(73) Assignee: Graphisoft R&D zrt., Budapest (HU)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,707

(22) Filed: May 2, 2011

(65) Prior Publication Data

US 2011/0205228 A1 Aug. 25, 2011

Related U.S. Application Data

(63) Continuation-in-part of application No. 11/796,208, filed on Apr. 27, 2007, now Pat. No. 7,936,354.

(51) Int. Cl.
*G06T 15/10* (2006.01)
(52) U.S. Cl. .................. 345/427; 345/619; 345/419
(58) Field of Classification Search .............. 345/427, 345/419, 619
See application file for complete search history.

*Primary Examiner* — Javid Amini
(74) *Attorney, Agent, or Firm* — Jackson Walker L.L.P.; Christopher J. Rourk

(57) ABSTRACT

A system for generating two-dimensional views of a three-dimensional model is provided. The system includes an active building model system generating one or more user-selected two-dimensional views of a three-dimensional building model. A floor plan view location system receives user control data and places a two-dimensional floor plan view in a user-selected location of a viewing window. An elevation view location system receives user control data and places a two-dimensional elevation view in a user-selected location of the viewing window.

19 Claims, 6 Drawing Sheets

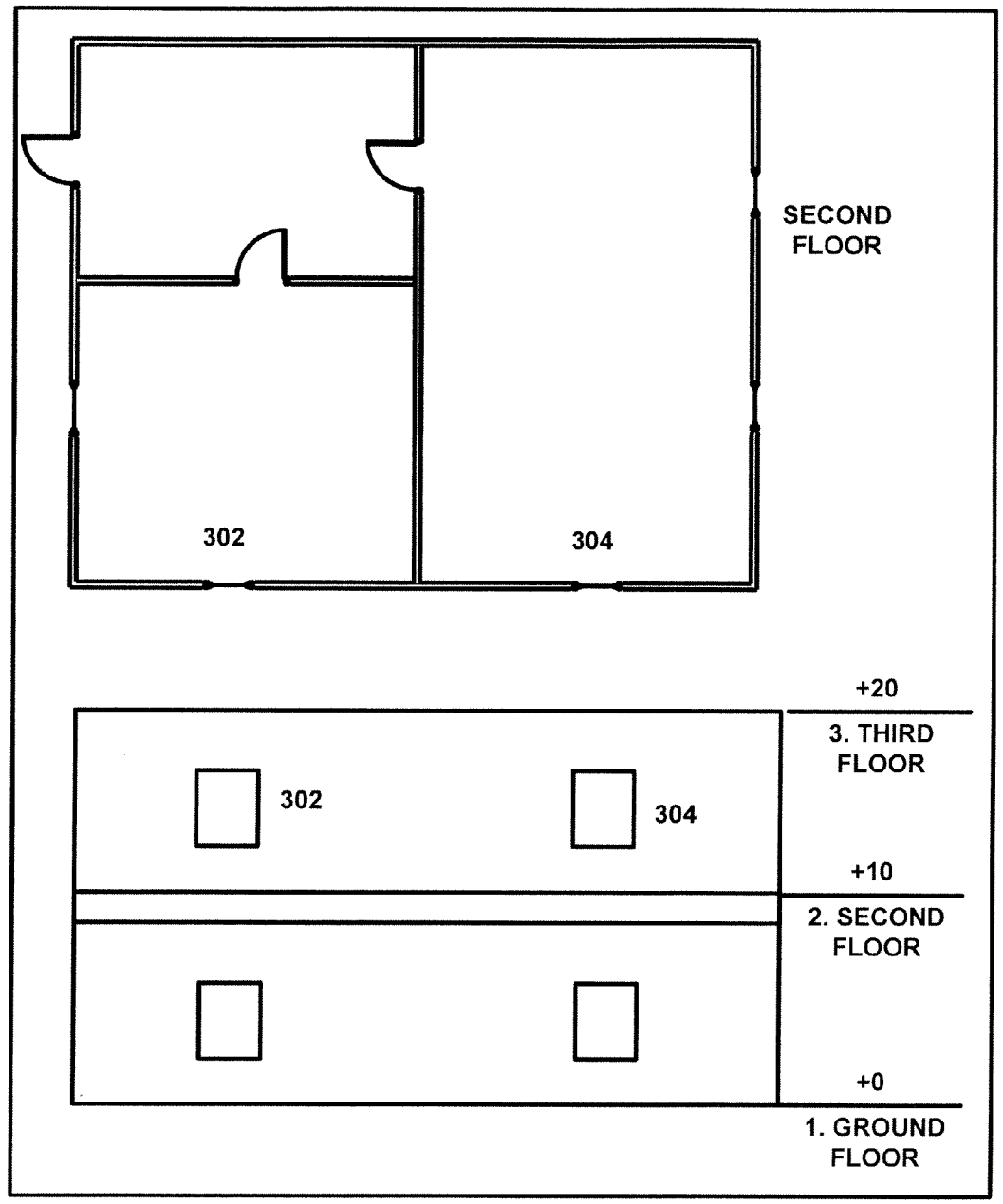

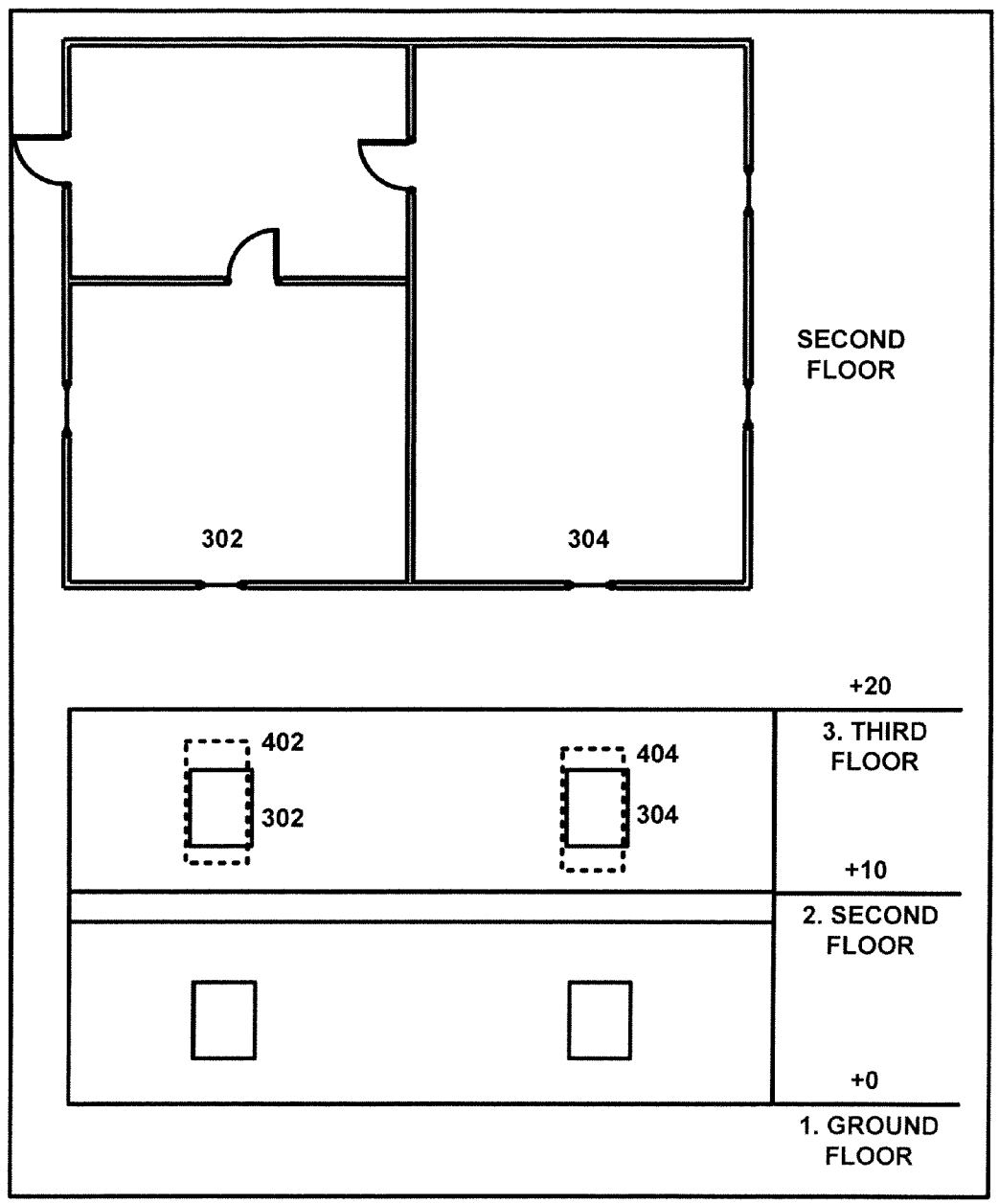
FIGURE 4    400 

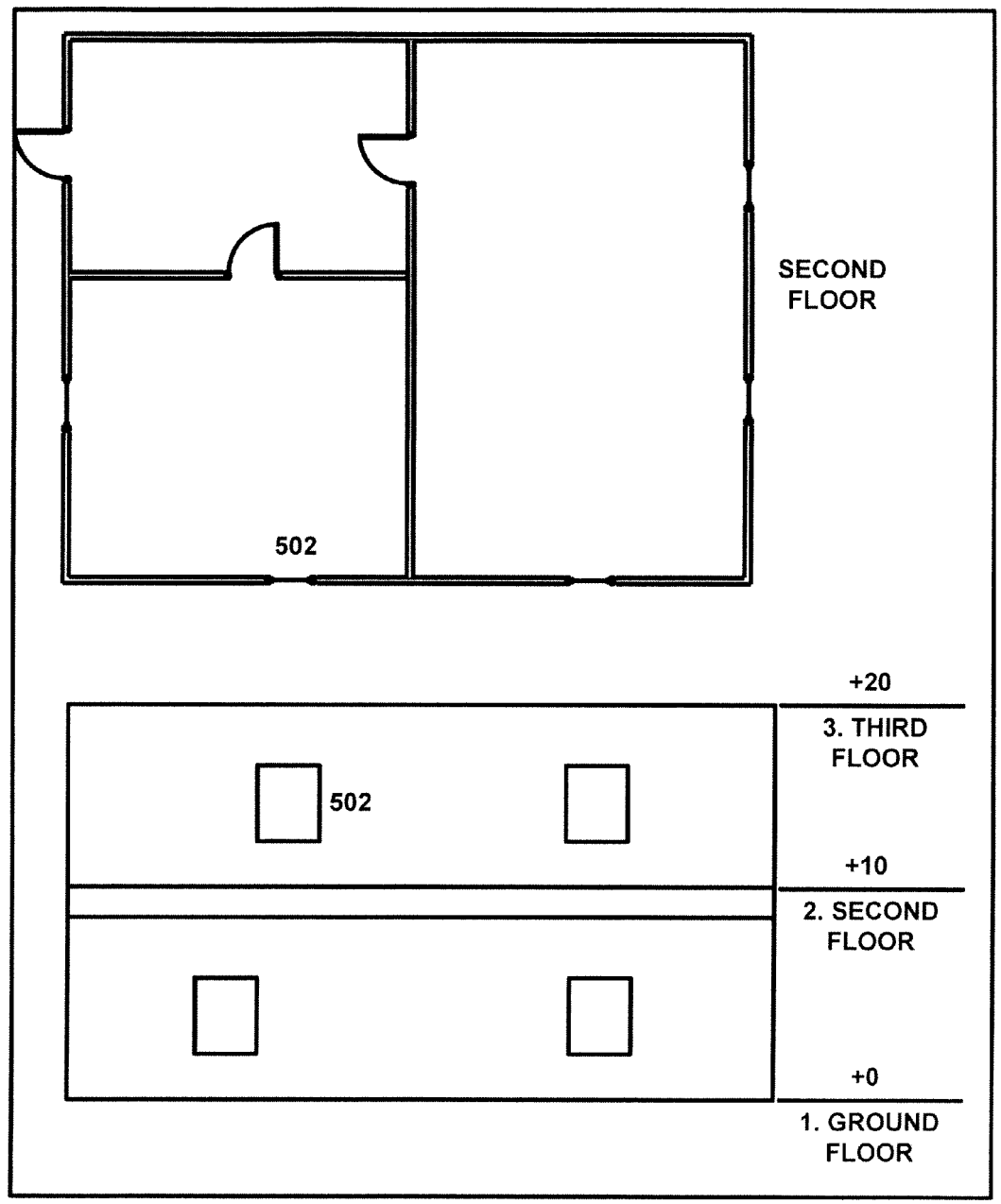

VIRTUAL TRACE-MULTIPLE VIEW MODELING SYSTEM AND METHOD

RELATED APPLICATIONS

This application claims benefit of priority and is a continuation application of U.S. patent application Ser. No. 11/796,208, filed Apr. 27, 2007, incorporated herein by reference for all purposes.

FIELD OF THE INVENTION

The present invention pertains to the field of computer-aided design, and more specifically to a system for generating a multiple live views from an active model in the same active window where the user is working. This allows the user to compare and coordinate the modifications effectuated on the active model view with another live view in the same active window without having to open another new active working window for a separate view to see the realized changes.

BACKGROUND OF THE RELATED ART

Systems for creating three-dimensional models of objects such as buildings are known in the art. Such systems allow the user to place features such as floors, ceilings, exterior walls, interior walls, doors, windows, columns or other support structures, and other suitable features in desired locations so as to create a three-dimensional model of a building or other suitable object. In addition, such systems allow a user to create views of the building or other object, such as to view the building or other object from a different perspective, to make a cut-away view through the object, or to otherwise change the view of the model.

Nevertheless, such models suffer from various shortcomings. One such shortcoming is the inability to coordinate and control the changes the active model without opening a new active window for a different view to check these changes. In addition, many modeling systems automatically implement changes to features throughout the model, such as when a change is made to a structural support, floor or exterior wall. While modifications can be made in any of the active windows it is still necessary to generate different views of the modifications but each in separate active windows in order to compare them to the modified view.

SUMMARY OF THE INVENTION

In accordance with the present invention, a system for creating multiple active views of a model and method of use are provided that allow a user to create and modify multiple active views of a active model and to view changes to the multiple views in a single window.

In particular, a system and method of use for creating and modifying multiple active views of a model are provided that allow a user to make changes to the model and to see the changes reflected in other active views of the model without having to generate new active views of the model in different windows.

In accordance with an exemplary embodiment of the present invention, a system for generating two-dimensional views of a three-dimensional model is provided. The system includes an active building model system generating one or more user-selected two-dimensional views of a three-dimensional building model. A floor plan view location system receives user control data and places a two-dimensional floor plan view in a user-selected location of a viewing window. An elevation view location system receives user control data and places a two-dimensional elevation view in a user-selected location of the viewing window.

The present invention provides many important technical advantages. One important technical advantage of the present invention is system for creating multiple active model views in a single window relative to a user-selected feature of the active model, and that allows a user to modify features of the active model and to view the modified features to the active model features in a single window, so that the user does not need to open and generate different windows showing different active model views to see the affect of such modifications.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 4 is a screen view of an unlinked model view and active model views in accordance with an exemplary embodiment of a present invention;

DETAILED DESCRIPTION OF THE INVENTION

Figure 1:
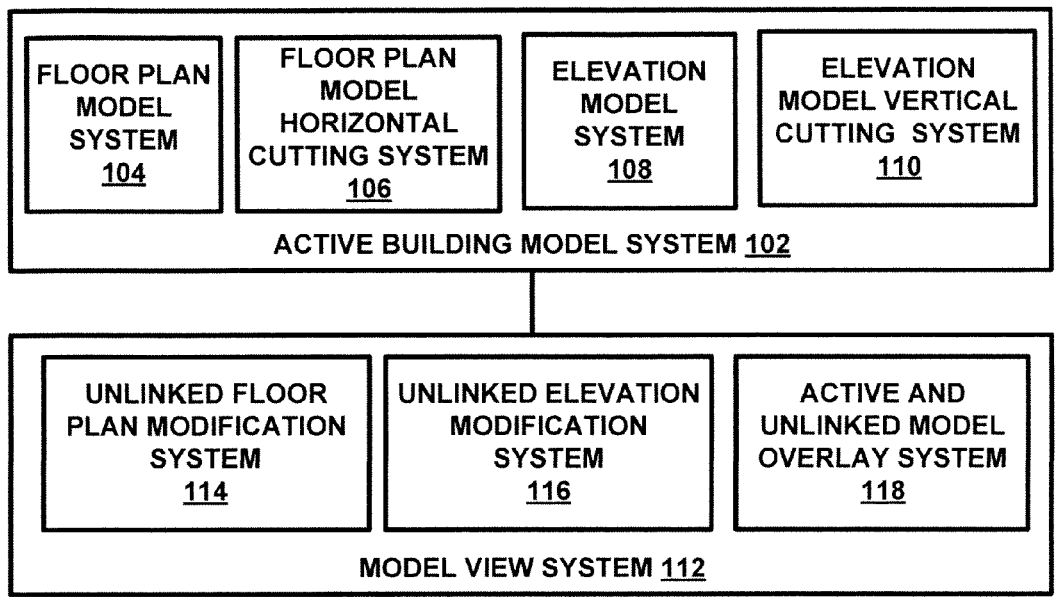
FIG. 1 is a diagram of a system for generating multiple model views of an active building model in accordance with an exemplary embodiment of a present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for generating multiple model views of an active building model in accordance with an exemplary embodiment of a present invention. System 100 allows a designer to select floor plans or elevations of an active building model and to create a multiple active views of the model that can be modified so as to allow the designer to view the effects of modifications in the different active views, and to also create or utilize unlinked views to assist with building model design.

System 100 includes active building model system 102. Acting building model system 102 includes a three-dimensional building model that further includes floor plan model system 104, floor plan model horizontal cutting system 106, elevation model system 108 and elevation model vertical cutting system 110, each of which can be implemented in hardware, software, or a suitable combination of hardware and software, and which can be one or more software systems operating under a general purpose processing platform. As used herein, a hardware system can include a combination of discrete components, an integrated circuit, an application-specific integrated circuit, a field programmable gate array, or other suitable hardware. A software system can include one or more objects, agents, threads, lines of code, subroutines, separate software applications, two or more lines of code or other suitable software structures operating in two or more software applications or on two or more processors, or other suitable software structures. In one exemplary embodiment, a software system can include one or more lines of code or other suitable software structures operating in a general purpose software application, such as an operating system, and one or more lines of code or other suitable software structures operating in a specific purpose software application.

Active building model system 102 stores model data for a three dimensional building structure, such as a house, office building, or other suitable structures. In one exemplary embodiment, active building model system 102 can be a building model system such as that disclosed in U.S. application Ser. No. 10/956,902, entitled "System and Method for Designing Building Structures With Associated Estimates and Schedules," which is hereby incorporated by reference for all purposes. Likewise, active building model system 102 can be other suitable building model systems.

Floor plan model system 104 allows floor plans to be generated for one or more floors of the building model. In one exemplary embodiment, floor plan model system 104 can allow a designer to place and modify walls, supports, columns, doors, windows, or other suitable building structural elements so as to create a floor plan model.

Floor plan model horizontal cutting system 106 allows a user to select a floor plan model and make a horizontal cut at a suitable or desired point. For example, floor plan model horizontal cutting system 106 can allow user to make a floor plan cut at a floor elevation, in between floors, such as a cut through the middle of a wall or in other suitable locations.

Elevation model system 108 allows a user to create elevation model views of the building model. In one exemplary embodiment, elevation model system 108 can allow user to place and modify interior walls, exterior walls, windows, doors, supports, or other suitable elevation elements of the building.

Elevation model vertical cutting system 110 allows a user to make an elevation model vertical cut in a suitable or desirable location. In one exemplary embodiment, the elevation model vertical cut can be made at an interior wall, an exterior wall, in the middle of a room or in other suitable locations so as to allow the user to make vertical cuts through the building model.

System 100 also includes model view system 112, which further includes unlinked floor plan modification system 114, unlinked elevation modification system 116, and active and unlinked model overlay system 118, each of which can be implemented in hardware, software, or a suitable combination of hardware and software, or a suitable combination of hardware and software, and which can be one or more software systems operating on a general purpose processing platform.

Model view system 112 allows a user to incorporate or create an unlinked model of the active building model of active building system 102 and to compare the unlinked model with the active model. In one exemplary embodiment, model view system 112 can create unlinked models based on selected floor plans, horizontal floor plan two-dimensional cuts, elevations, vertical elevation two-dimensional cuts, or other suitable selections from the active model.

Unlinked floor plan modification system 114 allows the user to modify features and elements of an unlinked floor plan. In one exemplary embodiment, the modifications can be made based on a floor plan that is selected as a view from an elevation two-dimensional cut selected from active building model system 102 and which is then unlinked from the active model. For example, a user may select an elevation two-dimensional cut through elevation model vertical cutting system 110, and can be presented with a floor plan for modification through unlinked floor plan modification system 114. Likewise, unlinked floor plan modification system 114 can allow a user to see floor plans selected from floor plan model system 104, floor plan model horizontal cutting system 106, or other suitable floor plans. The user can modify features on unlinked floor plan modification system 114, such as the size or location of interior walls, exterior walls, columns, doors, windows, floors, ceilings or other suitable features. These modifications show up as ghost or trace images, so that the user can compare the modification to the actual features in the active model. Likewise, an unlinked view can be imported from an external source and can be used to compare with the active model.

Unlinked elevation modification system 116 allows the user to view elevation views, such as related to selected floor plans or floor plan two-dimensional cuts, selected elevation or elevation two-dimensional cuts, or other suitable elevations, and to unlink those views from the active model. Likewise, a user can modify features shown in the unlinked elevation model, such as the size or location of interior walls, exterior walls, windows, doors, columns, floors, ceilings or other suitable features, such as to create a trace of the modified feature so the user can compare the modified feature in the unlinked view with the actual feature from the active model. Likewise, a user can import an unlinked elevation view and perform modifications, comparisons, or other suitable functions.

Active and unlinked model overlay system 118 creates an overlay of the active model view and unlinked model view. In one exemplary embodiment, a user can make modifications to an unlinked model and can compare the modifications to the active model by adjusting the emphasis, color, style, or other features of the lines and image data used to generate the active model view and the unlinked model view. In one exemplary embodiment, a user can select different colors for the active model view and unlinked model view, can select the location of each model view relative to the other model view, can select a feature such as an interior wall, exterior wall, door, window, column, floor, ceiling or other feature that the unlinked model view should be generated in relation to, or perform other suitable functions.

In operation, system 100 allows the user to create multiple active model views from elevations, floor plans, or other suitable two-dimensional cuts of a three dimensional model, and to modify features and elements in one model view and to view the effect of those changes in the other model view. A user can also use an active view and unlinked view so as to determine what effect the modifications may have without making those changes in the active model, which may be coordinated so as to create other undesired changes and so as to avoid the need to save versions of the model and the potential for inadvertently modifying an active model and the subsequent loss of data that can occur if such modifications are inadvertently saved without a back-up. Likewise, system 100 allows an active model view to be compared with an unlinked model view, such as to allow the user to modify the unlinked view and compare the active view and unlinked view so as to determine whether to incorporate the changes in the active model.

Figure 2:
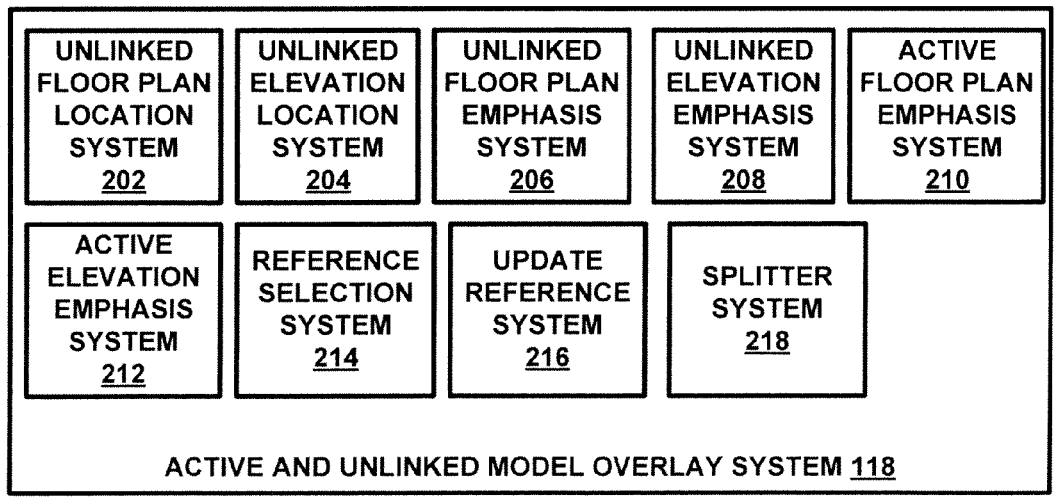
FIG. 2 is a diagram of a system for modifying features and elements of active and unlinked model views in accordance with an exemplary embodiment of the present invention.

FIG. 2 is a diagram of a system 200 for modifying features and elements of active and unlinked model views in accordance with an exemplary embodiment of the present invention. System 200 includes active and unlinked model overlay system 118 and floor plan view location system 202, elevation view location system 204, unlinked floor plan emphasis system 206, unlinked elevation emphasis system 208, active floor plan emphasis system 210, active elevation emphasis system 212, reference selection system 214, update reference system 216 and splitter system 218, each of which can be implemented in hardware, software, or a suitable combination of hardware and software, which can be one or more software systems operating on a general purpose processing platform.

Floor plan view location system 202 allows the user to select the location within a single viewing window of a floor plan that has been selected by the user. In one exemplary embodiment, a floor plan view from the active model or an unlinked floor plan view can be placed above, below, on top of, rotated relative to or in other suitable locations relative to an active or unlinked model floor plan view, an active or unlinked model elevation view, or other feature selected by the user as a reference.

Elevation view location system 204 allows a user to select the location within a single viewing window of an elevation view that has been selected by the user. In one exemplary embodiment, an elevation view can be placed in a suitable location, such as next to, above or below, on top of, rotated relative to or in other locations relative to the selected reference, such as an active or unlinked model floor plan view, an active or unlinked model elevation view, a feature or element contained within an active floor plan view or elevation view, or other suitable references.

Unlinked floor plan emphasis system 206 allows a user to adjust the emphasis given to an unlinked floor plan view, including the features and elements contained within the unlinked floor plan view. In one exemplary embodiment, the unlinked floor plan view can be shown in a different color, using different line types such as dashes, dots, combinations of dashes or dots, or other suitable forms of emphasis. Likewise, interior walls, exterior walls, doors, windows, structural members or other suitable features can be emphasized, omitted, or identified using different colors, using different line types such as dashes, dots, combinations of dashes or dots, or other suitable forms of emphasis.

Unlinked elevation emphasis system 208 allows a user to adjust the emphasis given to an unlinked elevation view, including the features and elements contained within the unlinked elevation view. In one exemplary embodiment, the unlinked elevation view can be shown in a different color, using different line types such as dashes, dots, combinations of dashes or dots, or other suitable forms of emphasis. Likewise, interior walls, exterior walls, doors, windows, floors, ceilings, structural members or other suitable features can be emphasized, omitted, or identified using different colors, using different line types such as dashes, dots, combinations of dashes or dots, or other suitable forms of emphasis.

Active floor plan emphasis system 210 allows a user to change the active floor plan view emphasis for one or more active floor plan views, such as the color, line type, thickness, or other suitable features. In one exemplary embodiment, each of the one or more active floor plan views can be shown in a different color, using different line types such as dashes, dots, combinations of dashes or dots, or other suitable forms of emphasis. Likewise, interior walls, exterior walls, doors, windows, structural members or other suitable features can be emphasized, omitted, or identified using different colors, using different line types such as dashes, dots, combinations of dashes or dots, or other suitable forms of emphasis.

Active elevation emphasis system 212 allows the user to change the active elevation emphasis given to one or more active elevation views. In one exemplary embodiment, each of the one or more active elevation views can be shown in a different color, using different line types such as dashes, dots, combinations of dashes or dots, or other suitable forms of emphasis. Likewise, interior walls, exterior walls, doors, windows, floors, ceilings, structural members or other suitable features can be emphasized, omitted, or identified using different colors, using different line types such as dashes, dots, combinations of dashes or dots, or other suitable forms of emphasis.

Reference selection system 214 allows a user to select a reference in a three-dimensional building model so as to generate one or more floor plan views or one or more elevation views relative to that reference. In one exemplary embodiment, reference selection system 214 can select a floor plan view, a floor plan cut view, an elevation view, an elevation model cut view, or a drawing feature from one of those cuts or plans, such as an interior wall, an exterior wall, a window, a door, a column, a floor, a ceiling or other suitable reference feature so as to allow a user to modify active or unlinked floor plan views or elevation views in relation to the selected reference.

Update reference system 216 allows a user to modify features in one of the active building model views and to update those features in another active building model view contained in a single window. In one exemplary embodiment, the user may move the location of a window, door, or other suitable feature in a first active model view, and that change can be reflected in the second active model view contained in the same viewing window, so as to allow the user to see the changes without having to open a separate active window view in a different window. After the change is updated in the first active model view, update reference system 216 modifies the second active model view so as to reflect the update.

Splitter system 218 allows a user to place an active model view on top of an unlinked model view and to use a slider control to see the difference between the two views. In one exemplary embodiment, a user can perform modifications to an unlinked two-dimensional floor plan or elevation relative to a selected reference, and can then view the active two-dimensional model floor plan or elevation relative to the modified unlinked floor plan or elevation by dragging or otherwise moving a controllable split line reference across the overlying views. In this manner, the user can compare the active and unlinked views of the floor plan or elevation that the user has been modifying.

In operation system 200 allows the user to create active and unlinked two-dimensional model views from a three-dimensional model so as to view the effect of modifications to different active views from the model in a single viewing window, to change the emphasis given to the active views or an unlinked model view, or for other suitable purposes.

Figure 3:
FIG. 3 is a screen view of exemplary active model views in a single viewing window in accordance with an embodiment of a present invention.

FIG. 3 is a screen view 300 of exemplary active model views in a single viewing window in accordance with an embodiment of a present invention. Screen view 300 includes an active model two-dimensional second floor plan, which is a layout or floor plan drawing. Likewise, screen view 300 includes an active model two-dimensional elevation view showing an exterior wall with elevations of a ground floor at zero feet, a second floor at ten feet and a third floor at twenty feet. Both of the active model views are contained within screen view 300, and the user can select the location of each. For example, the user could alternatively choose to place the active model floor plan view beneath the active model elevation view, to the side of the elevation model view, on top of the elevation model view (such as to view two overlying floor plans), or in other suitable locations. Likewise, any other suitable active model floor plan, elevation, or feature can be used to generate the active model views.

In both of the active model second floor plan view and the model exterior wall elevation view, windows 302 and 304 can be seen. In the active model floor plan view on top of screen view 300, windows 302 and 304 are shown as stylized locations within the exterior wall selected for the active model elevation view. Likewise, in the active model elevation view on the bottom half of screen view 300, windows 302 and 304 are shown in elevation view, as they would appear to a user outside of the building.

FIG. 4 is a screen view 400 of an unlinked model view and active model views in accordance with an exemplary embodiment of a present invention. Screen view 400 includes the active model second floor plan view having windows 302 and 304 and an active model elevation view on top of an unlinked model elevation view of the exterior wall where a user has modified the size of windows 302 and 304 to create windows 402 and 404. However, no changes have been made to the active model views. In this manner, a user can modify the unlinked model view so as to view the effect of those changes without creating the changes in the active model views.

Likewise, a user can modify the emphasis given to the features in the unlinked model view relative to the active model view, such as is shown in the elevation view at the bottom of FIG. 4 where window 302 and window 304 from the active model view are shown with solid lines and windows 402 and 404 from the unlinked model view are shown with dashed lines. Likewise, emphasis can be changed through the use of different colors, by blocking the appearance of windows 302 and 304, by allowing the user to toggle between windows 302 and 304 and windows 402 and 404, or in other suitable manners.

Figure 5:
FIG. 5 is a screen view of active model views in accordance with an exemplary embodiment of the present invention.

FIG. 5 is a screen view 500 of active model views in accordance with an exemplary embodiment of the present invention. Screen view 500 shows the effects of an updated window 502 from the active model in the two active model views, in a single window. In both the second floor plan view and the elevation model view from the active model, window 502 has been moved to a new location relative to window 402 such as by modifying either the floor plan view or the active model view. Upon updating the location of window 502 in either one of the active model views, the location of window 502 in the other active model view is updated without the need to open a new active model view window. In this manner, a user that has made a change in one active model view can see the changes in the other active model view without the need to open a new active model view in a different window.

In operation, screen view 500 shows how a user can create an active building model, can make modifications to one view of the active building model, and can view these modifications in another view of the active model without opening a new view of the active model in a different window. In this manner, changes made to the active model can be seen in different views of the active model contained within a single window, so as to allow user to see the affect of changes to the active model in different views without requiring the user to open new active model views in different viewing windows.

Figure 6:
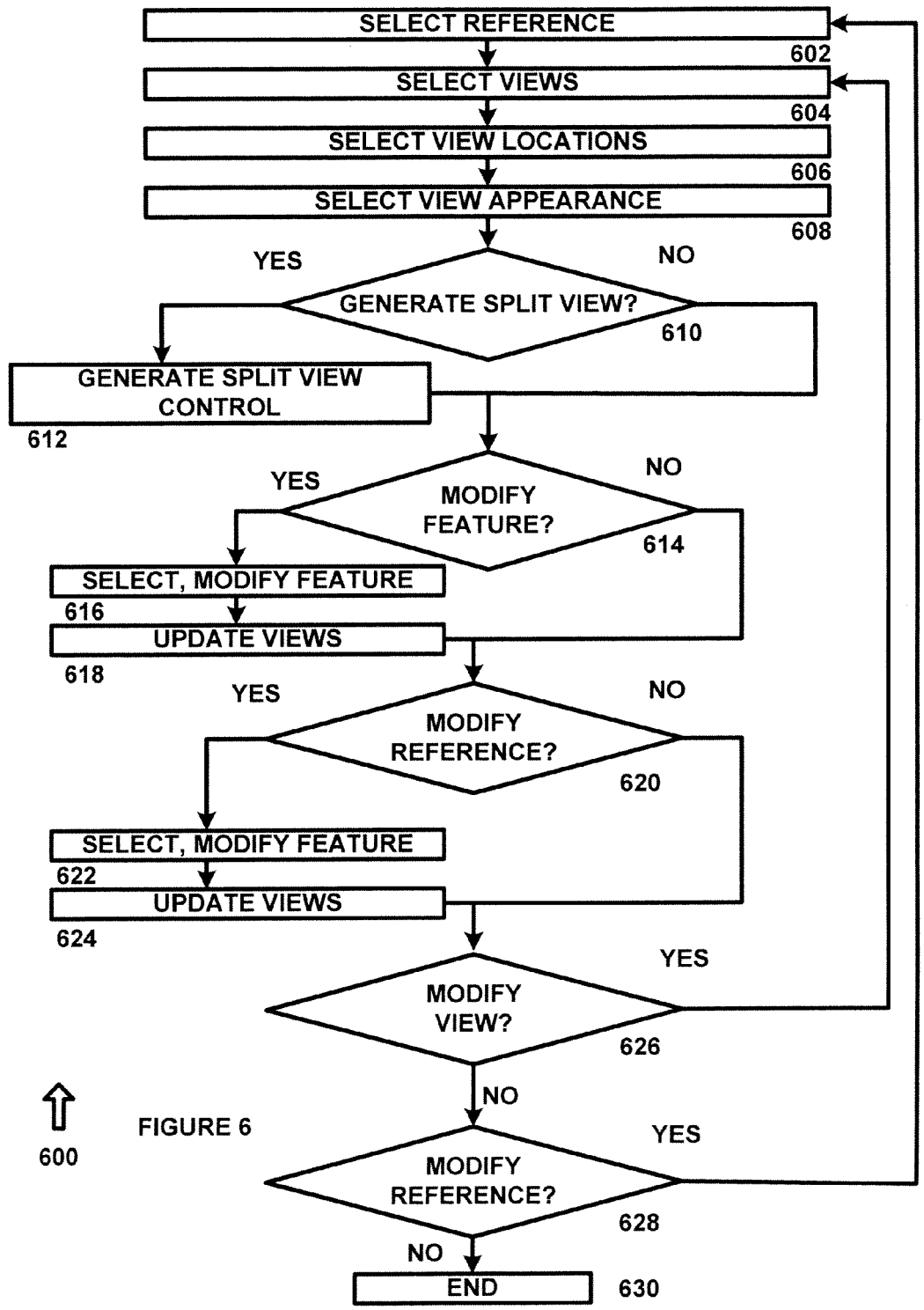
FIG. 6 is a flowchart of a method for creating and viewing multiple model views in accordance with an exemplary embodiment of the present invention.

FIG. 6 is a flowchart of a method 600 for creating and viewing multiple model views in accordance with an exemplary embodiment of the present invention.

Method 600 begins at 602 where a reference from an active model is selected. In one exemplary embodiment, the reference can be an exterior wall, an interior wall, a floor, a ceiling, a door, a window, a structural member, or other suitable features or references in the active model, such as a three-dimensional building model or other suitable models. The method then proceeds to 604.

At 604, one or more views are selected. In one exemplary embodiment, the view or views can be the selected reference, can be a two-dimensional floor plan or elevation view relative to the selected reference, or can be other suitable views. Likewise, the views can include an unlinked model view that has already been created and modified by another user, or that is created for modification by the user from the active model. The method then proceeds to 606.

At 606, model view locations are selected. In one exemplary embodiment, the user can place the views above the selected reference from the active model, below the active model reference, on top of the active model reference, offset from the active model reference, or in other suitable locations. Likewise, the user can place two different active model views within a single viewing window, such as by placing a floor plan view above an elevation view, two floor plan views on top of each other, an unlinked model view (e.g. an elevation view) above or below an active model view of the same view (e.g. the elevation view) or a different view (e.g. a floor plan view), an unlinked model view (e.g. an elevation view) on top of an active model view (e.g. the same elevation view) and above or below another active model view (e.g. a floor plan view), or using other suitable views and location combinations. The method then proceeds to 608.

At 608, the view appearance for each view is selected. In one exemplary embodiment, the color, line style, thickness or other suitable features of the various views can be modified by the user to allow the user to distinguish the different active views, an active view from an unlinked view, or in other suitable manners. The method then proceeds to 610.

At 610, it is determined whether a split view should be generated. In one exemplary embodiment, a user can select a split view control that allows a floor plan or elevation view from the active model that matches an unlinked model floor plan or elevation view that is being modified by the user. If it is determined that a split view should be generated, the method proceeds to 612 where split view controls are generated. In one exemplary embodiment, the split view controls can allow the user to select a splitter line that can be moved horizontally, vertically, or in other suitable direction, and which shows the active model floor plan or elevation on one side and the unlinked model floor plan or elevation on the other side. In this exemplary embodiment, the user can drag or otherwise move the splitter bar so as to view the difference between the active model floor plan or elevation and the unlinked model floor plan or elevation, so as to readily determine the changes being made in the unlinked model view relative to the active model view. If it is determined that a split view should not be generated at 610, the method proceeds to 614.

At 614 it is determined whether a feature should be modified. If the feature is to be modified, the method proceeds to 616 where a feature is selected and modified. In one exemplary embodiment, the feature can include an interior wall dimension or location, an exterior wall dimension or location, a floor dimension or location, a ceiling dimension or location, a door dimension or location, a window dimension or location, a column or structural support dimension or location, or other suitable features. The method then proceeds to 618 where the model views are updated. In one exemplary embodiment, a user can select different active model views within a single window, such that the modified feature is updated in each of the active model views within the single window. Likewise, the user can modify unlinked model view features, such as where an unlinked model view has been generated in the viewing window. The method then proceeds to 620. Likewise, if it is determined at 614 that the feature should not be modified, the method proceeds to 620.

At 620, it is determined whether a modification to the reference is required. If a modification to the reference is required, the method proceeds to 622 where a reference feature is selected. In one exemplary embodiment, an interior wall, an exterior wall, a floor, a ceiling, a door, a window, a column or structural support, or other suitable features can be selected as the reference for the different active model views. The method then proceeds to 624 where the views are updated, so as to reflect to the views relative to the selected feature. The method then proceeds to 626. Likewise, if it is determined at 620 the reference should not be modified, the method proceeds directly to 626.

At 626, it is determined whether a view modification is required. In one exemplary embodiment, the user can select different views so as to view the effect of modifications in different views than the ones previously selected, can create or import unlinked model views, or can perform other suitable functions. If a view modification is selected, the method returns to 604. Otherwise, the method proceeds to 628.

At 628, it is determined whether a reference is to be modified. In one exemplary embodiment, the user can select a new reference, such as a new floor plan, elevation, or other suitable references to as to allow the user to view the active model or modifications to the active model relative to the new reference, to generate new active or unlinked model views, or to perform other suitable functions. It if it determined at 628 that the reference should be modified, the method returns to 602, otherwise the method proceeds to 630 and terminates. Likewise, the method can also or alternatively return to other previous steps, such as to allow the user to generate a split view, modify a reference, modify a view, modify an unlinked view, or to perform other suitable functions.

In operation, method 600 allows the user to create a multiple views of a building model in a single window without the need to open additional windows, so as to allow the user to readily determine the effect of changes to the model in different views, to compare unlinked model views to active model views, or to perform other suitable functions. Likewise, method 600 allows the user to implement changes to the active model without altering the different views of the active model, or to perform other suitable functions.

Figure 7:
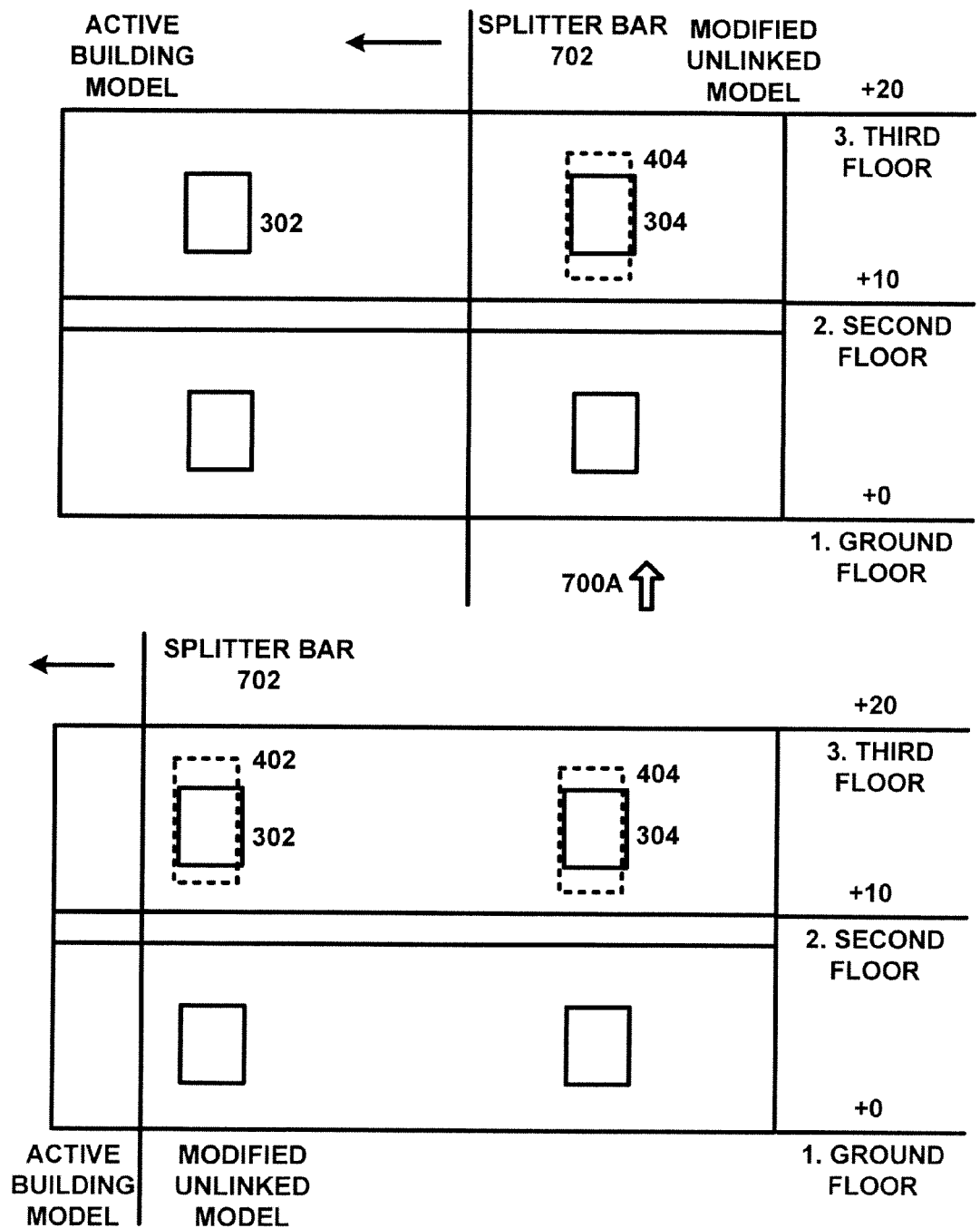
FIG. 7 is a diagram of views for providing split view control in accordance with an exemplary embodiment of the present invention.

FIG. 7 is a diagram of views 700A and 700B for providing split view control in accordance with an exemplary embodiment of the present invention. View 700A shows an exemplary elevation view having a user-controllable splitter bar 702 that can be moved in a suitable direction, such as the direction indicated by the arrow. On the right-hand side of splitter bar 702, the overlying active model view and unlinked model view is shown with active model window 304 and unlinked model window 404, whereas on the left-hand side of splitter bar 702, only the active model view is shown with active model window 302. View 700B shows an exemplary elevation view where the user-controllable splitter bar 702 has been moved in the direction indicated by the arrow. On the right-hand side of splitter bar 702, the overlying active model view and unlinked model view is shown with active model windows 302 and 304 and unlinked model windows 402 and 404, whereas on the left-hand side of splitter bar 702, only the active model view is shown.

Using the split view control, a user can modify an unlinked model view of a floor plan or elevation, and can then readily compare the modified unlinked model view to the active model view. Although a vertical splitter bar is shown in FIG. 7, a horizontal bar or a bar having another suitable orientation can also or alternatively be selected.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for generating two-dimensional views of a three-dimensional model comprising:
    an active building model system for electronically generating one or more user-selected two-dimensional views of a three-dimensional building model using a general purpose processor;
    a floor plan model horizontal cutting system that can generate an interior building model floor plan centered on a user selection of a location in between two floors and at a selected location along one of a plurality of interior walls of the three-dimensional building model; and
    an elevation model vertical cutting system that can generate an interior building model elevation view centered on a user selection of a location in at a selected location in one of a plurality of interior rooms of the three-dimensional building model.

2. The system of claim 1 further comprising an unlinked floor plan emphasis system for electronically receiving user control data and changing an appearance of an unlinked floor plan view within a viewing window.

3. The system of claim 1 further comprising an unlinked elevation emphasis system for electronically receiving user control data and changing an appearance of an unlinked elevation view within a viewing window.

4. The system of claim 1 further comprising an active floor plan emphasis system for electronically receiving user control data and changing an appearance of an active floor plan view within a viewing window.

5. The system of claim 1 further comprising an active elevation emphasis system for electronically receiving user control data and changing an appearance of an active elevation view within a viewing window.

6. The system of claim 1 further comprising a reference selection system for electronically receiving user control data and selecting one or more reference features from an active model for generating one or more of a two-dimensional floor plan view and a two-dimensional elevation view.

7. The system of claim 1 further comprising a splitter system for electronically receiving user control data and modifying an appearance of an unlinked model view and an active model view.

8. A method for generating two-dimensional views of a three-dimensional model comprising:
    electronically accessing a three-dimensional building model using a general purpose processor;
    generating an interior building model floor plan centered on a user selection of a location in between two floors and at a selected location along one of a plurality of interior walls of the three-dimensional building model; and
    generating an interior building model elevation view centered on a user selection of a location at a selected location in one of a plurality of interior rooms of the three-dimensional building model.

9. The method of claim 8 further comprising receiving user control data and changing an appearance of an unlinked floor plan view within a viewing window.

10. The method of claim 8 further comprising receiving user control data and changing an appearance of an unlinked elevation view within a viewing window.

11. The method of claim 8 further comprising receiving user control data and changing an appearance of an active floor plan view within a viewing window.

12. The method of claim 8 further comprising receiving user control data and changing an appearance of an active elevation view within a viewing window.

13. The method of claim 8 further comprising receiving user control data and selecting one or more reference features from the active model for generating one or more of a two-dimensional floor plan view and a two-dimensional elevation view.

14. The method of claim 8 further comprising receiving user control data and modifying an appearance of an unlinked model view and an active model view.

15. A system for generating two-dimensional views of a three-dimensional model comprising:
- means for generating one or more user-selected two-dimensional views of a three-dimensional building model;
- a floor plan model horizontal cutting system operating on a general purpose processor that can electronically generate an interior building model floor plan centered on a user selection of a location in between two floors and at a selected location along one of a plurality of interior walls of the three-dimensional building model; and
- an elevation model vertical cutting system that can electronically generate an interior building model elevation view centered on a user selection of a location at a selected location in one of a plurality of interior rooms of the three-dimensional building model.

16. The system of claim 15 further comprising means for receiving user control data and changing an appearance of a floor plan view within a viewing window.

17. The system of claim 15 further comprising means for receiving user control data and changing an appearance of an elevation view within a viewing window.

18. The system of claim 15 further comprising means for receiving user control data and selecting one or more reference features from the active model for generating one or more of a two-dimensional floor plan view and a two-dimensional elevation view.

19. The system of claim 15 further comprising means for receiving user control data and modifying an appearance of an unlinked model view and an active model view.

* * * * *